United States Patent
Wake et al.

(10) Patent No.: US 7,469,105 B2
(45) Date of Patent: Dec. 23, 2008

(54) OPTICAL FIBER COMMUNICATIONS METHOD AND SYSTEM WITHOUT A REMOTE ELECTRICAL POWER SUPPLY

(75) Inventors: David Wake, Needham Market (GB); Matthew Webster, Needham Market (GB)

(73) Assignee: NextG Networks, Inc., San Jose, CA (US)

( * ) Notice: Subject to any disclaimer, the term of this patent is extended or adjusted under 35 U.S.C. 154(b) by 577 days.

(21) Appl. No.: 10/821,590

(22) Filed: Apr. 9, 2004

(65) Prior Publication Data

US 2005/0226625 A1  Oct. 13, 2005

(51) Int. Cl.
*H04B 10/00* (2006.01)
(52) U.S. Cl. .................. 398/171; 398/113; 398/115
(58) Field of Classification Search ............... 398/171, 398/113, 115
See application file for complete search history.

(56) References Cited

U.S. PATENT DOCUMENTS

| | | | |
|---|---|---|---|
| 5,664,035 A * | 9/1997 | Tsuji et al. ................. 385/24 |
| 5,949,564 A * | 9/1999 | Wake ........................ 398/168 |
| 6,362,906 B1 * | 3/2002 | O'Shea ..................... 398/126 |
| 6,414,958 B1 * | 7/2002 | Specht .................. 370/395.53 |
| 6,525,855 B1 | 2/2003 | Westbrook et al. |
| 2003/0118280 A1 * | 6/2003 | Miyazaki et al. ............. 385/24 |
| 2004/0047313 A1 * | 3/2004 | Rumpf et al. ............... 370/335 |
| 2007/0117592 A1 * | 5/2007 | Bauman ................... 455/562.1 |

OTHER PUBLICATIONS

Banwell et al., "Powering the fiber loop optically—a cost analysis", J. Lightwave Tech., vol. 11, pp. 481-494, 1993.*
Banwell, Thomas C. et al., "Powering The Fiber Loop Optically-A Cost Analysis", Journal of Lightwave Technology, vol. 11, No. 3, Mar. 1993, pp. 481-494.
Carson, Richard F., "Modular Photonic Power And VCSEL-Based Data Links For Aerospace And Military Applications", IEEE, Jul. 1997, pp. 197-210.

* cited by examiner

*Primary Examiner*—Jason Chan
*Assistant Examiner*—Nathan M Curs
(74) *Attorney, Agent, or Firm*—Vierra Magen Marcus & DeNiro LLP

(57) ABSTRACT

The present invention allows remote antenna units for radio frequency signal transmission and receipt to operate without the requirement for remote electrical power supplies or for connecting cables that incorporate electrical conductors. According to an aspect of the present invention, an optical communications system employing radio frequency signals comprises a central unit; at least one remote unit having at least one optoelectronic transducer for converting optical data signals to radio frequency signals and converting radio signals to optical signals and at least one antenna to receive and send radio frequency signals; at least one optical fiber data link between the central unit and the remote unit for transmitting optical data signals therebetween; and at least one optical fiber power link between the central unit and the remote unit for providing electrical power at the remote unit.

23 Claims, 2 Drawing Sheets

OPTICAL FIBER COMMUNICATIONS METHOD AND SYSTEM WITHOUT A REMOTE ELECTRICAL POWER SUPPLY

BACKGROUND OF THE INVENTION

1. Field of the Invention

The present invention relates to optical fiber communications methods, systems and terminals for use in such systems and to cellular and radio distribution points.

2. Description of the Related Art

The use of analog optical fiber transmission links to distribute cellular and other radio communications signals from a central location (where the radio base stations are situated) to one or more remote locations (where the antenna points are situated) is a well established technique commonly known as "radio over fiber." Radio over fiber makes use of the broad bandwidth and low attenuation characteristics of optical fiber, which allows these systems to be deployed over very long spans for applications such as shopping malls and airports in the case of cellular radio. The remote antenna units in these systems comprise an optical transmitter (laser), an optical receiver (photodiode) and various electrical components such as amplifiers and filters. Most of these components are active and therefore need an electrical power supply in order to function. This electrical power supply is either provided locally (for example through a tap to a power outlet) or centrally using copper conductors in the cable linking the remote antenna units to the central unit where the electrical power supply is located (power over copper).

There are drawbacks to both ways of providing remote electrical power. Local electrical power supplies can be expensive or impractical to install, depending on the circumstances of the remote locations. Composite cable (containing mixed fiber and copper) is not a preferred cable type within the cabling industry and also has a relatively short reach capability due to ohmic losses in the copper. Furthermore, there are special situations, such as hazardous explosive environments and military applications, where electrical isolation and/or the avoidance of radio frequency interference or other undesired emissions from copper cable are critically important.

There are two approaches for eliminating a remote electrical power supply. The first approach is to have a remote unit that does not require a power supply at all. U.S. Pat. No. 6,525,855 discloses a remote antenna unit that requires no electrical power supply. The remote antenna unit relies, instead, on the use of an unbiased electroabsorption modulator as an optical detector and as an optical modulator, i.e., as an optical transceiver that requires no electrical power supply. If no electrical amplifiers or other active components are used in the remote antenna unit, then no electrical power supply is required at all.

This approach, however, has limited appeal in certain situations. First, only low radio frequency power is available, which limits the radio range to a few meters, depending on radio system and propagation environment. Second, electrical amplifiers are generally required in the remote antenna unit in order to boost the radio frequency power to levels required for acceptable radio range (typical amplifier gains required are in the range 20-30 dB depending on the application).

The second approach for eliminating a remote electrical power supply is to provide power through the optical fiber. "Power over fiber" is a technique that uses a high power laser at a central location, a photovoltaic converter at a remote location and an optical fiber linking the two sites for transmission of the optical power. The photovoltaic converter provides an electrical power output from the optical power input. For example, Banwell et al., "Powering the fiber loop optically—a cost analysis", J. Lightwave Tech., vol.11, pp. 481-494, 1993 discloses the use of power over fiber to provide power to a subscriber's telephone equipment. Aside from this limited application, Banwell only considers power over fiber to be practical for low data rate telephony.

Carson, "Modular photonic power and VCSEL-based data links for aerospace and military applications", proc. IEEE Aerospace Conference, vol.3, pp. 197-210, 1997, discusses power over fiber in the context of aerospace and military applications. In such applications, electrical shielding of the remote module is typically required. The remote unit disclosed by Carson, for example, is in a Faraday Cage Wall. To allow for such electrical shielding, the remote unit receives its power over fiber with the use of a photovoltaic converter. Carson explains that the use of photovoltaic converter demands low power consumption which, in turn, requires low data rate. The disclosed design is thus limited to ultra-low power consumption and low data rates under 10 kb/s. Carson notes that such a design is applicable when the photonic channels are not required to transmit analog radio frequency data.

BRIEF SUMMARY OF THE INVENTION

An object of the present invention is to provide a means of deploying remote antenna units for radio frequency signal transmission without the requirement for remote electrical power supplies or for connecting cables that incorporate electrical conductors.

According to a first aspect of the present invention, an optical communications system employing radio frequency signals comprises: a central unit; at least one remote unit, said remote unit having at least one optoelectronic transducer for converting optical data signals to radio frequency signals and converting radio signals to optical signals and at least one antenna to receive and send radio frequency signals; at least one optical fiber data link between the central unit and the remote unit for transmitting optical data signals therebetween; and at least one optical fiber power link between the central unit and the remote unit for providing electrical power at the remote unit.

The present invention is based on the inventors' realization that, surprisingly, the use of power transmission over fiber optic cables, in combination with low power consumption component architectures, can provide sufficient electrical power at a remote site to meet the requirements of optical fiber fed antenna units for radio frequency signal transmission. Thus a combined power over fiber and radio over fiber system can be used to deploy remote antenna units for applications where remote electrical power supplies or cables containing electrical conductors are either impractical or difficult to provide, or where health and safety will be compromised. In the latter case, electrical isolation and immunity to electromagnetic interference are often mandatory. Such situations can be encountered for example in antenna installations around petrochemical plants.

Preferably, the data link optical components at the remote antenna unit will have low power consumption. Examples of these components include vertical cavity surface emitting lasers (VCSELs), electroabsorption transceivers (EATs) and PIN photodiodes. VCSELs are known to operate at low bias currents, typically 10-15 mA, which is four or five times lower than conventional edge-emitting lasers. EATs operate with even lower power consumption requirements since in this architecture the optical energy for the reverse link is derived from a centrally-located laser.

The preferred option for the data laser at the central unit is an edge-emitting laser (either Fabry Perot or Distributed Feedback types) that can tolerate high RF input power without introducing unacceptable distortion. By this means, the RF power produced from the remote data link photodiode will be correspondingly high (for a given gain, the more power put in to the optical data link, the more power will be available at its output), which means less amplification will be required from the forward link power amplifier to achieve the required RF output power. Of course, the data laser at the central unit can also be a low power consumption device as discussed above.

The present invention as described above uses separate optical fibers for the power and data links. In some situations it is beneficial to save the number of fibers required in the connecting cable between central and remote units. In these situations wavelength division multiplexing (WDM) may be used to combine optical energy from the power laser and data laser at the central unit over a single optical fiber. A WDM combiner at the central unit and a WDM splitter at the remote unit would be used to facilitate this arrangement.

The radio frequency signals sent or radiated from the remote antenna unit may be those of commercial wireless systems such as cellular and wireless LAN networks including ultra wideband radio, or for applications such as radar, radio tagging and identification, broadcast wireless, satellite repeaters or radio surveillance. The radio frequency signals in a wireless communications system can comprise multiple radio carriers within multiple frequency bands with multiple protocols. It should be noted that some of these potential applications require a bidirectional data link (such as for cellular networks), while others require unidirectional data links (either to or from the remote unit). The present invention includes radio frequency signals that may support any one or more of the applications given above.

The radio frequency signals transmitted between the central and remote units will usually be those of conventional analog RF. In some circumstances it may be preferable to transmit the RF signals in digital form in order to avoid noise and distortion penalties. This type of signal is commonly known as 'digital RF', where the analog RF signal is converted to digital form using a fast analog to digital converter (ADC) and back again to analog after transmission using a digital to analog converter (DAC). This aspect of the invention relates to both analog and digital RF.

According to a second aspect of the present invention, an optical communications system employing radio frequency signals comprises: a central unit; at least one remote unit, said remote unit having a means for converting optical data signals to radio frequency signals and converting radio signals to optical signals, a means for converting optical data signals into baseband digital signals and converting baseband digitals signals to optical data signals and at least one antenna to receive and send radio frequency signals; at least one optical fiber data link between the central unit and the remote unit for transmitting optical data signals therebetween; and at least one optical fiber power link between the central unit and the remote unit for providing electrical power at the remote unit.

This second aspect realizes that there are situations where it is useful to transmit mixed analog and digital data signals, for example to provide Ethernet ports at the remote units in addition to the radio frequency connections to the antennas.

According to a third aspect of the present invention, a method for communicating between a central unit and at least one remote unit, said method comprising: transmitting an optical data signal from the central unit to the remote unit through an optical fiber data link and transmitting radiation from the central unit to the remote unit through an optical fiber power link to electrically power the remote unit; converting the optical data signal to a radio frequency signal at the remote unit through an optoelectronic transducer; and sending the radio frequency signal into free space through an antenna connected to the remote unit.

This aspect of the present invention can be employed by the optical communications systems disclosed herein.

According to a fourth aspect of the present invention, a method for communicating between a central unit and at least one remote unit, said method comprising: transmitting radiation from the central unit to the remote unit through an optical fiber power link to electrically power the remote unit; receiving a radio frequency signal from an antenna connected to the remote unit; converting the radio frequency signal to an optical data signal at the remote unit through an optoelectronic transducer; and transmitting the optical data signal to the central unit through an optical fiber data link.

This aspect of the present invention can be employed by the optical communications systems disclosed herein.

According to a fifth aspect of the present invention, a remote terminal in an optical communications system employing radio frequency signals, said remote terminal connected with a central unit via at least one optical fiber and comprising: at least one antenna to receive and send radio frequency signals; at least one optoelectronic transducer for converting optical data signals to radio frequency signals from the antenna and for converting radio signals to optical signals for transmission to the central unit; and a means for converting radiation transmitted from the central unit to electrically power the remote unit.

These and other features and advantages of embodiments of the present invention will be apparent to those skilled in the art from the following detailed description of the embodiments of the invention, when read with the drawings and the appended claims.

BRIEF DESCRIPTION OF THE SEVERAL VIEWS OF THE DRAWING(S)

DETAILED DESCRIPTION OF THE INVENTION

In the following description of preferred embodiments, reference is made to accompanying drawings which form a part hereof and in which is shown by way of illustration specific embodiments in which the invention may be practiced. It is to be understood that other embodiments may be utilized and structural changes may be made without departing from the scope of the preferred embodiments of the present invention.

Figure 1:
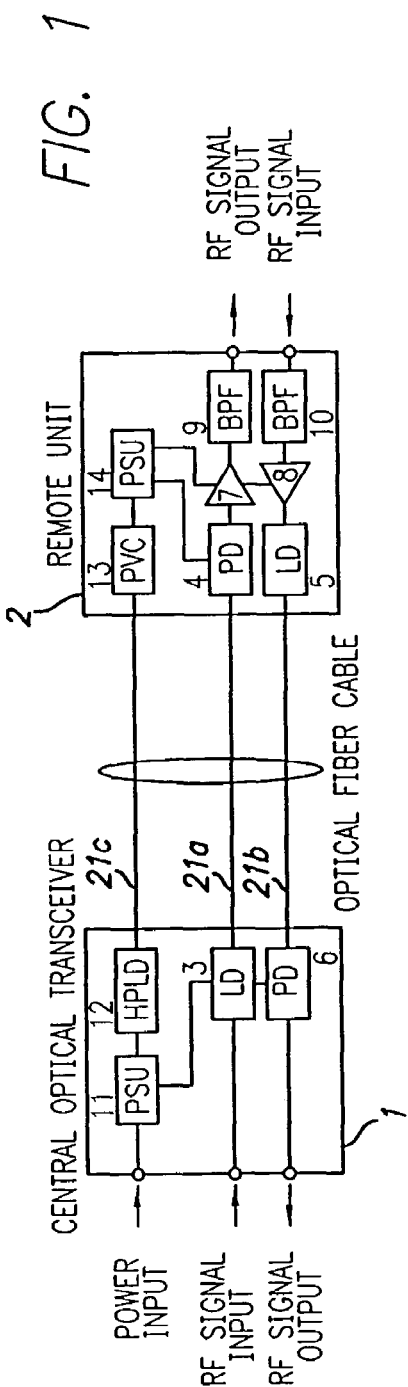
FIG. 1 illustrates an optical communications system of the present invention.

FIG. 1 illustrates an optical communications system of the present invention. A central optical transceiver (COT) 1 is connected to one or more remote units (RU) 2 via optical fiber cable. The forward optical fiber data path or link comprises a laser diode 3 in the COT and a photodiode 4 in the RU linked using an optical fiber 21a. The photodiode 4 converts optical data signals from the COT to radio frequency signals for transmission by an antenna (not illustrated in FIG. 1).

The reverse optical fiber data path or link comprises of a laser diode 5 in the RU and a photodiode 6 in the COT also linked using an optical fiber 21b. The laser diode 5 converts radio signals received from the antenna (not illustrated) to optical data signals to be sent to the COT. The photodiode 4 and laser diode 5 of the RU are optoelectronic transducers. Although FIG. 1 illustrates two optoelectronic transducers (photodiode 4 and laser diode 5), a single optoelectronic transducer may be used such as an electroabsorption transceiver. An electroabsorption transceiver can convert optical data signals to radio frequency signals and convert radio frequency signals to optical data signals.

Forward 7 and reverse 8 amplifiers are used in the RU to bring the data signals to a level suitable for onward transmission. Forward 9 and reverse 10 band pass filters are used in the RU to limit the power of the out of band signals entering or leaving the transmission system. The forward and reverse data signals are radio frequency carriers, for example for either wireless communications or radar applications.

It should be noted that the COT 1 and the RU 2 are connected by a plurality of optical fibers 21a, 21b and 21c in FIG. 1. However, it may be beneficial to save the number of fibers used by using a reduced number of optical fibers, including just a single optical fiber.

In conventional radio frequency (RF) over fiber transmission systems, the RU derives its electrical power requirements (for the optical components and amplifiers) from either a remote electricity supply or from a power supply unit in the COT via conductive cables. In the present invention, the power requirements for the RU are provided from a power supply 11 in the COT via optical fiber cable. This is accomplished using a high power laser diode (HPLD) 12 in the COT, linked using optical fiber 21c to a photovoltaic converter (PVC) 13 in the RU. The PVC converts the optical power from the HPLD into electrical power. A regulator 14 converts the electrical power from the PVC into a form (either constant voltage or constant current) that is required by the active components in the RU.

In the wireless communications system example, the RF data signals are radio carriers pertaining to cellular networks such as GSM and CDMA2000. In this example, the RF input and output terminals of the COT connect to cellular base station equipment and the RF input and output terminals of the RU connect to antennas (not shown in FIG. 1). The RU and its antennas therefore jointly comprise a remote antenna for the base station, for extended coverage of the RF footprint. The remote antenna provides a radio connection point for the many mobile terminals within its coverage area.

Figure 3:
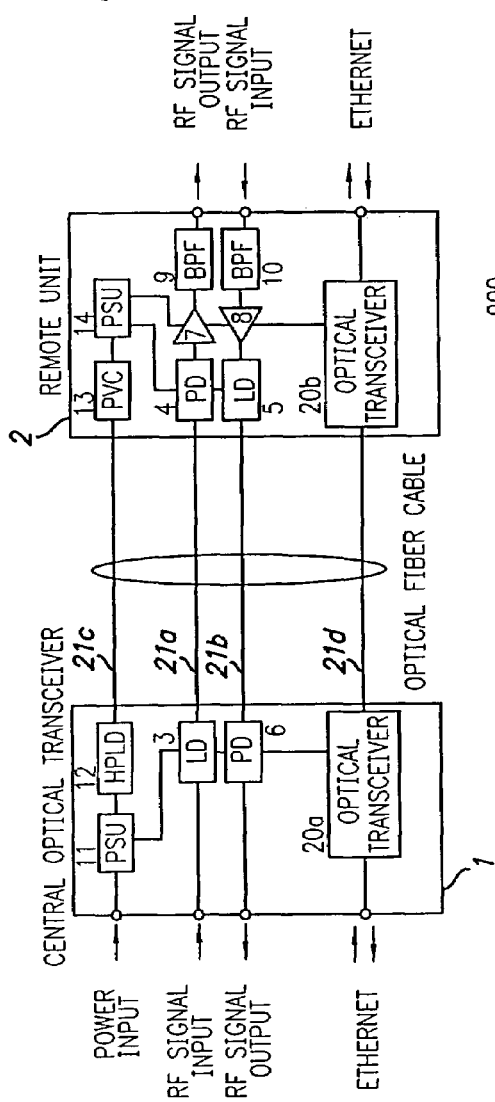
FIG. 3 illustrates another optical communications system of the present invention where mixed analog and digital data signals are required.

FIG. 3 illustrates another optical communications system of the present invention where mixed analog and digital data signals are required. References numbers in FIG. 3 that are identical to FIG. 1 refer to the same component or device described above with respect to FIG. 1. In situations where mixed analog and digital data signals are required, the embodiment of FIG. 3 includes a separate digital link comprising a pair of optical transceivers 20a and 20b connected by optical fiber 21d. These optical transceivers are digital devices and a typical protocol would be Ethernet. The RU would then have a separate Ethernet output for connecting Ethernet devices such as wireless LAN access points or closed circuit TV cameras. The Ethernet connection point at the COT would typically connect to an Ethernet concentrator and from there into the wider area network.

Figure 2:
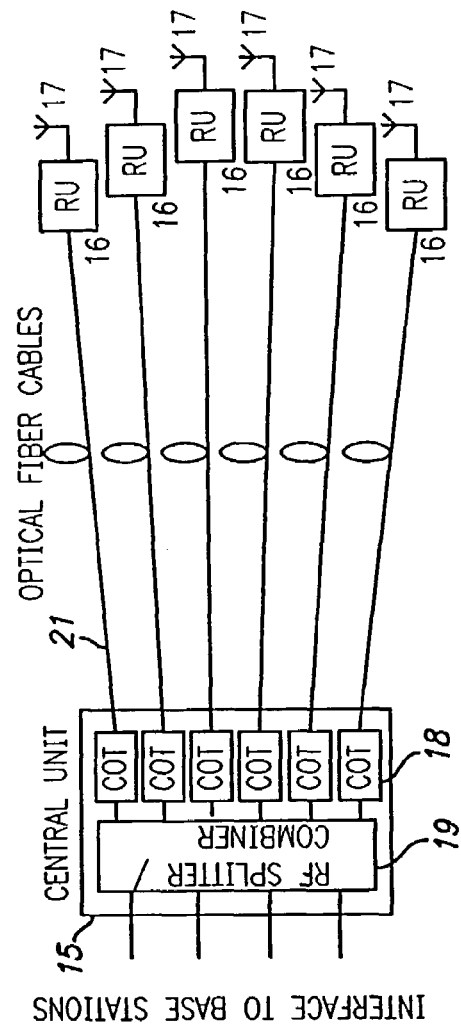
FIG. 2 illustrates another optical communications system of the present invention.

FIG. 2 discloses another optical communications system of the present invention with a plurality of COTs and RUs. A central unit (CU) 15 is connected to several RUs 16 using optical fibers such as optical fiber 21. Each RU connects to a single antenna 17. The CU 15 comprises several COTs 18 that provide the optical power and optical data transceivers for the transmission links to the RUs. The CU also contains an RF splitter/combiner module 19 that combines the forward link RF signals from a number of base stations and splits the power to the COTs. In the reverse link this module combines the signals from the COTs and splits them to the base stations.

Electrical power requirements for the RU vary widely depending on the RF power requirements of the cellular system. Given the limitations of electrical power available from optical transmission, it is prudent to use this technique for applications requiring short range radio coverage such as in-building cellular systems. Many short range applications require RF power per radio carrier of around 0 dBm. For 4 radio carriers for example, the total RF power required will be 6 dBm. If we take GSM900 as a typical cellular system to be used with this technique, then a power amplifier with an output power capability of +15 dBm is required, taking into account the back-off required to achieve acceptably low distortion of the GSM signals. An example of a suitable low power consumption power amplifier is the SGA-4563, which is a silicon-germanium amplifier produced by Sirenza Microdevices. This amplifier has a power consumption of only 160 mW. Adding a low noise amplifier and photodiode for the remaining forward link active components gives a total forward link power consumption of 190 mW.

The preferred type of data laser in the RU is a vertical cavity surface emitting laser (VCSEL). VCSELs have lower power consumption than conventional edge-emitting lasers and add around 30 mW to the RU power budget. Combining the power consumption of this laser with a reverse link low noise amplifier gives a total reverse link power consumption of 60 mW. Total RU power consumption for this example (4×GSM900 carriers at 0 dBm/carrier) is therefore 250 mW.

Photovoltaic converters have an efficiency of around 40% at an optical wavelength of between 800 and 850 nm. Therefore the optical power required from the high power laser diode in the COT is around 500 mW. Fortunately, this optical power is routinely available from lasers at this wavelength at reasonable cost. In fact, powers of at least 2 W are practical for this application, which allows the possibility of either optical power sharing between a number of RUs (thereby reducing the cost per RU substantially) or increasing the power available at the RU to provide more RF power (either power per radio carrier or total number of radio carriers). If even more RF power is required at the RU, then the possibility exists of using two or more parallel power transmission links per RU.

Figure 4:
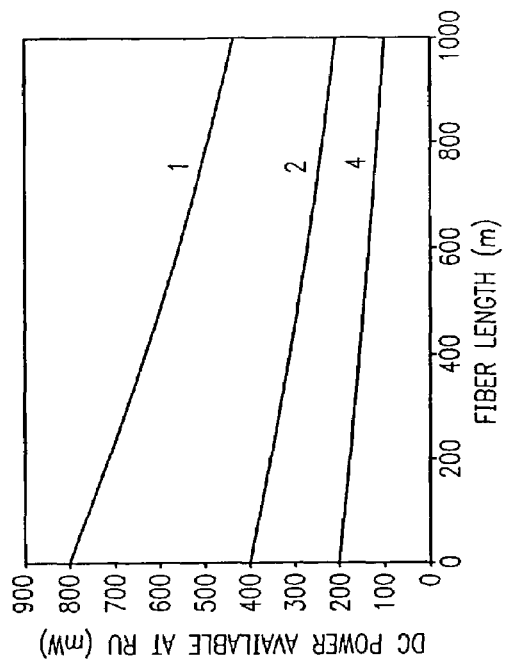
FIG. 4 is a graph illustrating electrical power as a function of optical fiber length and the split ratio of a high power laser diode.

FIG. 4 shows how the electrical power available at the RU varies as a function of the fiber length and the split ratio of the high power laser diode, assuming a photovoltaic converter efficiency of 40% and a laser power of 2 W. Split ratios of 1, 2 and 4 are illustrated. It can be seen that the required dc power of 250 mW can be achieved for fiber lengths of up to 900 m for a split ratio of 2. A split ratio of more than 2 can be acceptable if the power per carrier requirements are reduced. For example, the electrical power requirement can be reduced to 150 mW (using Sirenza Microdevices part number SGA-2486) if the power per carrier target was reduced to −6 dBm for 4 GSM900 carriers. In this case, fiber lengths of up to 600 m are achievable for a split ratio of 4.

Power transmission using the HPLD and PVC described above requires multimode optical fiber (MMF) to function efficiently. There are, however, alternative HPLDs and PVCs that function efficiently over single mode optical fiber (SMF). The optical data links (forward and reverse) can function using either MMF or SMF.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An optical communications system employing radio frequency signals, the system comprising:
    a plurality of optical transceiver units including at least one optical transceiver unit in communication with at least one base station of a plurality of base stations in a cellular wireless communications network, the at least one optical transceiver unit communicates reverse link radio frequency signals to the at least one base station and receives forward link radio frequency signals from the at least one base station;
    at least one remote unit which is remote from the at least one optical transceiver unit, the at least one remote unit provides a radio connection point for mobile terminals in an associated coverage area, the at least one remote unit comprising at least one optoelectronic transducer for converting optical data signals to radio frequency signals and converting radio signals to optical signals, and at least one antenna to receive and send radio frequency signals;
    at least one optical fiber data link between the at least one optical transceiver unit and the at least one remote unit for transmitting optical data signals therebetween;
    at least one optical fiber power link between the at least one optical transceiver unit and the at least one remote unit for providing electrical power at the at least one remote unit;
    a radio frequency combiner between the plurality of optical transceiver units and the plurality of base stations which combines reverse link radio frequency signals which are received from the plurality of optical transceiver units; and
    a radio frequency splitter which splits the combined reverse link radio frequency signals, the radio frequency splitter is in communication with the plurality of base stations and is associated with the radio frequency combiner.

2. The optical communications system according to claim 1 wherein the at least one optoelectronic transducer comprises an electroabsorption transceiver.

3. The optical communications system according to claim 1 wherein the at least one optoelectronic transducer comprises a first optoelectronic transducer for converting optical data signals to radio frequency signals and a second optoelectronic transducer for converting radio frequency signals to optical signals.

4. The optical communications system according to claim 3 wherein the first and second optoelectronic transducers are low power consumption devices.

5. The optical communications system according to claim 4 wherein the second optoelectronic transducer comprises a VCSEL laser.

6. The optical communications system according to claim 3 wherein the second optoelectronic transducer comprises an edge-emitting laser.

7. The optical communications system according to claim 1, further comprising:
    the radio frequency combiner combines forward link radio frequency signals which are received from the plurality of base stations.

8. The optical communications system according to claim 1 wherein an optical fiber provides both the at least one optical fiber data link and the at least one optical fiber power link using wavelength division multiplexing.

9. The optical communications system according to claim 1, wherein the radio frequency signals comprise multiple radio carriers within multiple frequency bands with multiple protocols.

10. The optical communications system according to claim 1, wherein:
    the at least one remote unit comprises a photovoltaic converter for converting optical power from the at least one optical fiber power link into electrical power, and an amplifier coupled between the at least one optoelectronic transducer and the at least one antenna, the amplifier amplifies the radio frequency signals obtained by the converting of the optical data signals for transmission to the mobile terminals, the amplifier is coupled to the photovoltaic converter for receiving the electrical power.

11. The optical communications system according to claim 1, wherein:
    the at least one remote unit comprises at least one active component, a photovoltaic converter for converting optical power from the at least one optical fiber power link into electrical power, and a regulator for converting the electrical power into a constant voltage or a constant current form that is required to power the at least one active component.

12. The optical communications system according to claim 1, wherein:
    the at least one optical transceiver unit comprises a first, high power laser diode coupled to the at least one optical fiber power link and a second laser diode coupled to the at least one optical fiber data link.

13. The optical communications system according to claim 12, wherein:
    the high power laser diode provides radiation on the at least one optical fiber power link with a power of about 500 mW.

14. The optical communications system according to claim 12 wherein:
    the high power laser diode provides radiation on the at least one optical fiber power link with a power of at least 2 W.

15. The optical communications system according to claim 1, further comprising:
    a plurality of remote units, each providing a radio connection point for mobile terminals in associated coverage areas;
    at least one optical fiber data link between the at least one optical transceiver unit and each of the remote units for transmitting optical data signals therebetween; and
    at least one optical fiber power link between the at least one optical transceiver unit and each of the remote units for providing electrical power at each of the remote units.

16. An optical communications system employing radio frequency signals, the system comprising:
    a central unit;
    at least one remote unit, which is remote from the central unit, the at least one remote unit provides a radio connection point for mobile terminals in an associated coverage area, said at least one remote unit having first means for converting optical data signals to radio frequency signals and converting radio frequency signals to optical data signals, second means for converting optical data signals into baseband digital signals and converting baseband digital signals to optical data signals, and at least one antenna to receive and send radio frequency signals, the second means communicates with a local area network;

at least one optical fiber data link between the central unit and the at least one remote unit, and associated with the first means, for transmitting optical data signals;

at least one optical fiber data link between the central unit and the at least one remote unit, and associated with the second means, for transmitting optical data signals; and at least one optical fiber power link between the central unit and the at least one remote unit for providing electrical power at the at least one remote unit.

17. The optical communications system according to claim 16 wherein the baseband digital signals are used in a protocol of the local area network.

18. The optical communications system according to claim 17 wherein the local area network protocol is Ethernet.

19. An optical communications system employing radio frequency signals, the system comprising:

a plurality of base stations in a cellular wireless communications network;

a central unit comprising a plurality of optical transceiver units and a radio frequency splitter-combiner, the radio frequency splitter-combiner is operatively provided between the plurality of optical transceiver units and the plurality of base stations;

a plurality of remote units which are remote from the central unit, each remote unit provides a radio connection point for mobile terminals in an associated coverage area, the plurality of remote units transmit forward link radio frequency signals to mobile terminals via respective antennas and receive reverse link radio frequency signals from mobile terminals via respective antennas, each remote unit is associated with a different one of the optical transceiver units; and a different optical fiber data link and a different optical fiber power link between each remote unit and its associated optical transceiver unit.

20. The optical communications system according to claim 19, wherein:

the radio frequency splitter-combiner combines forward link radio frequency signals which are received from the plurality of base stations.

21. The optical communications system according to claim 19, wherein:

the radio frequency splitter-combiner combines reverse link radio frequency signals which are received from the plurality of optical transceiver units.

22. The optical communications system according to claim 21, wherein:

the radio frequency splitter-combiner splits the combined reverse link radio frequency signals.

23. An optical communications system employing radio frequency signals, the system comprising:

a plurality of optical transceiver units including at least one optical transceiver unit in communication with at least one base station of a plurality of base stations in a cellular wireless communications network, the at least one optical transceiver unit communicates reverse link radio frequency signals to the at least one base station and receives forward link radio frequency signals from the at least one base station;

a plurality of respective remote units including at least one remote unit which is remote from the at least one optical transceiver unit, the at least one remote unit provides a radio connection point for mobile terminals in an associated coverage area, the at least one remote unit comprising at least one optoelectronic transducer for converting optical data signals to radio frequency signals and converting radio signals to optical signals, and at least one antenna to receive and send radio frequency signals;

at least one optical fiber data link between the at least one optical transceiver unit and the at least one remote unit for transmitting optical data signals therebetween;

at least one optical fiber power link between the at least one optical transceiver unit and the at least one remote unit for providing electrical power at the at least one remote unit;

a radio frequency combiner between the plurality of optical transceiver units and the plurality of base stations which combines reverse link radio frequency signals which are received from the plurality of optical transceiver units;

the plurality of respective remote units provide respective radio connection points for mobile terminals in associated respective coverage areas, each respective remote unit is in communication with a different respective optical transceiver unit of the plurality of optical transceiver units;

a different optical fiber data link between each respective optical transceiver unit and its respective remote unit for transmitting optical data signals therebetween; and a different optical fiber power link between each respective optical transceiver unit and its respective remote unit for providing electrical power at the respective remote unit.

* * * * *

UNITED STATES PATENT AND TRADEMARK OFFICE
CERTIFICATE OF CORRECTION

PATENT NO. : 7,469,105 B2
APPLICATION NO. : 10/821590
DATED : December 23, 2008
INVENTOR(S) : Wake Page 1 of 1

It is certified that error appears in the above-identified patent and that said Letters Patent is hereby corrected as shown below:

Col. 10, line 32: After "one remote unit" and before "a radio frequency" insert --a plurality of optical transceiver units;--

Signed and Sealed this

Sixteenth Day of June, 2009

JOHN DOLL
*Acting Director of the United States Patent and Trademark Office*